United States Patent [19]
Demyon et al.

[11] 3,820,098
[45] June 25, 1974

[54] ELECTRICAL AND VISUAL FLUID LEVEL SENSOR

[76] Inventors: Thomas R. Demyon, 6201 Loch Raven Blvd., Baltimore, Md. 21212; Nicholas J. LaCosta, Box 218, Rt. No. 3, Phoenix, Md. 21131

[22] Filed: Apr. 18, 1972

[21] Appl. No.: 245,226

[52] U.S. Cl. ............................ 340/244 B, 340/420
[51] Int. Cl. .......................................... G08b 19/00
[58] Field of Search ......... 340/244 B, 244 A, 244 R

[56] References Cited
UNITED STATES PATENTS

| | | | |
|---|---|---|---|
| 2,120,825 | 6/1938 | Wolfert | 340/244 B |
| 2,356,652 | 8/1944 | Connolly | 340/244 B |
| 2,851,566 | 9/1958 | Fuller | 340/244 B |

*Primary Examiner*—Thomas B. Habecker
*Attorney, Agent, or Firm*—Walter G. Finch, Esq.

[57] ABSTRACT

An improved method and liquid level sensor device is provided for monitoring the level of fluid in a container, by either or both, visual or electrical means.

The sensor device is mounted onto a container and projects into the same. A small glass cap located on the outside section of the sensor device remains full of the liquid as long as the desired liquid level inside of the container is maintained. When the level of the liquid in the container falls, the cap will empty, thus giving a visual check. The section of the sensor device that is on the inside of the container has a float which follows the level of the liquid. When the liquid level falls, the float also falls, thereby closing a magnetic switch which causes a warning light or buzzer to be activated. This sensor device can also contain a pressure switch to monitor the pressure in the container and give an alarm by electrical means.

4 Claims, 4 Drawing Figures

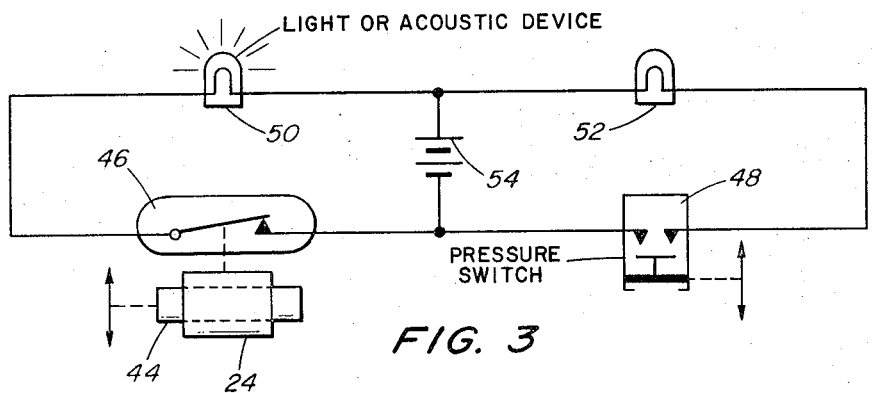
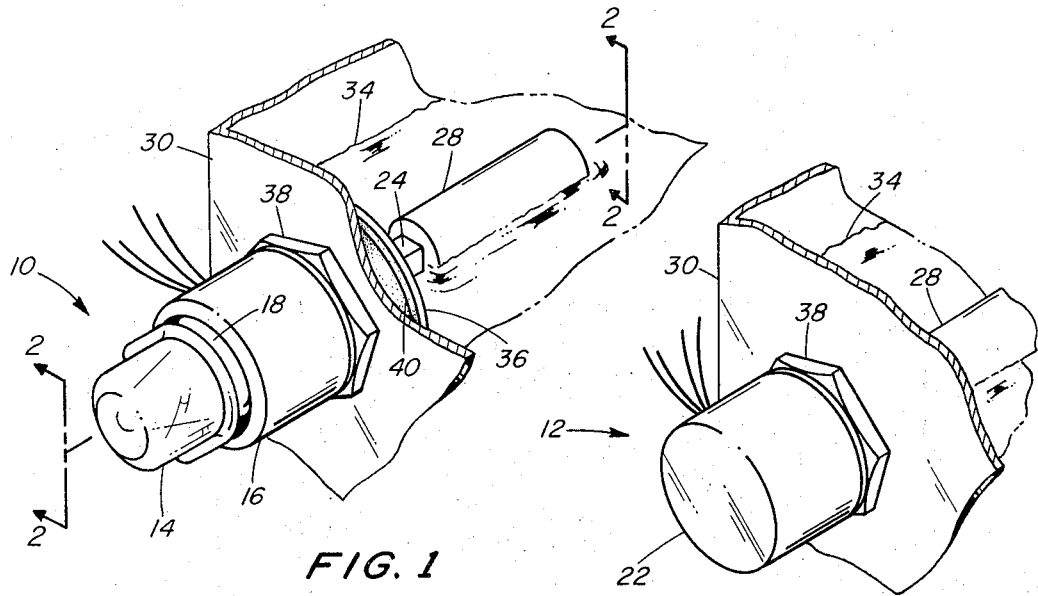
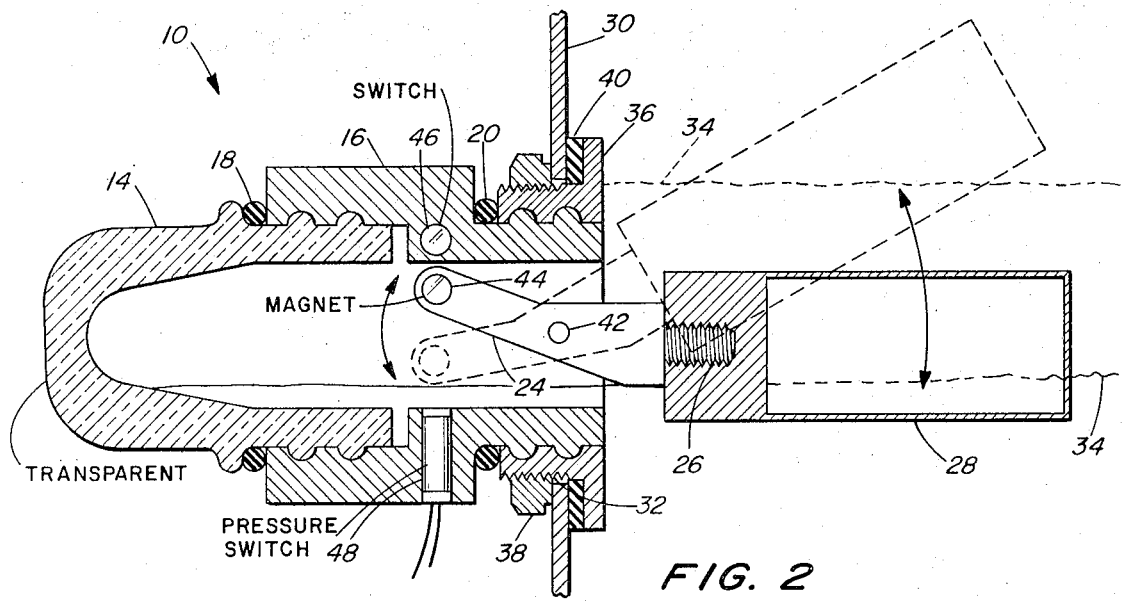

ELECTRICAL AND VISUAL FLUID LEVEL SENSOR

This invention relates generally to fluid level monitoring apparatus, and more particularly it pertains to an improved sensor device for monitoring fluid levels in a container by, either or both, visual or electrical means.

There are many uses for this type of liquid level sensor, as, for example, in the automobile. For the driver to tell if he has enough water in his radiator, he must unscrew the radiator cap (very carefully, if the water is hot), look down into the opening for the cap, and then replace the cap.

It is an object of this invention, therefore, to provide a liquid level sensor which can be installed in the radiator of an automobile to give the operator thereof a quick visual check every time that the hood is opened.

Another object of this invention is to provide an electrical fluid level sensor for the operator of an automobile while driving if the water level in the radiator should drop, a warning light or a buzzer on the dashboard would let the operator know immediately of the low liquid level in the radiator.

The same device can also be used to ascertain the oil level in the power steering box and the fluid level in the master brake cylinder.

A further object of this invention is to provide a liquid level sensor that has the flexibility of being used as a visual or electrically operated fluid level checker.

A still further object of this invention is to provide a fluid level sensor which can also monitor the pressure level in a container.

Other objects and attendant advantages of this invention will become more readily apparent and understood from the following detailed specification and accompanying drawings in which:

FIG. 1 is a perspective view of a fluid and pressure liquid level sensor shown with the visual as well as the electrical components, installed onto a tank or automobile radiator and incorporating features of this invention;

FIG. 2 is a cross sectional elevation view taken along line 2—2 of FIG. 1;

FIG. 3 is a schematic diagram showing the elctrical hook-up for both the fluid and pressure level warning indicators of this invention; and FIG. 4 is a perspective view of the fluid and pressure level sensor with only the electrical component installed onto a tank or radiator.

Referring now to the drawings, as viewed in FIG. 1, there is shown an improved sensor 10 mounted onto a tank or automobile radiator 30 and incorporating features of this invention.

A glass cap 14 is provided for visual monitoring and it is located on the outside of the tank 30. On the inside of the tank 30, there is provided a float 28.

In FIG. 2, there is a detailed sketch of the sensor 10. The sensor 10 is positioned onto the tank 30 through a mounting hole 32 and it is secured by the sealing washer 40, a mounting bushing 36, and a retaining nut 38.

A housing 16 which contains the float 28 is screwed into place using a rubber gasket 20.

The glass cap 14 is screwed into the housing 16 using a rubber gasket 18. A lever 24 which is attached to the float 28 by means of the screw 26 is pivoted at point 42.

At the end of the lever 24 opposite the float 28, there is mounted a magnet 44. As the fluid level 34 falls, the magnet is rotated closer to a sealed reed switch 46 mounted in the housing 16. Finally when the fluid level drops to a certain level, the magnet 44 is in close proximity with the reed switch 46, thus causing it to close.

There is also mounted in the housing 16, as an optional feature, a miniature pressure switch 48 which can be incorporated into the warning system.

FIG. 3 is a schematic diagram illustrating an electrical hook-up of the sensor 10. Shown is the reed switch 46 which is activated by the magnet 44 mounted on the lever 24, and the pressure switch 48. Either of these switches 46 or 48 when closed will complete the electrical circuit. Light 50 may alternatively be an acoustic device.

In FIG. 4, there is shown an optional type sensor 12 utilizing electrical warning only incorporated in a housing 22. The components are similar to those of FIG. 1, except that the glass cap 14 is omitted.

Obviously many modifications and variations of the present invention are possible in light of the above teachings. It is, therefore, to be understood that within the scope of the appended claims the invention may be practiced otherwise than as specifically described.

What is claimed is:

1. A visually and remotely inspectable liquid level sensor system for a container having fluid therein, comprising:

a closed container having a fluid therein, said container having an aperture formed into a wall thereof;

housing means having an internal cavity and being disposed externally of the closed container, the housing means further having an inner end portion positioned in said aperture and extending into said container whereby fluid from said container may enter into the internal cavity in said housing means;

transparent cover means on that portion of the housing means lying externally of said closed container, said cover means communicating with the internal cavity in said housing means whereby fluid in said cavity may be viewed for monitoring the fluid level in said container;

means for sealing the periphery of said housing in said aperture in the wall of said container;

float means positioned in said fluid in said container and having a pivotally mounted end extending into said internal cavity in said housing;

magnetic means positioned on the pivotally mounted end of said float means;

switch means positioned in the wall of said housing and operable by said magnetic means;

an electrical circuit having a source of power; and, signal means connected to said switch means, whereby said magnetic means on the pivotally mounted end of said float means is moved into closer proximity to said switch means on lowering of said float means due to a decrease in fluid level in said container and activates said switch means to close said electrical circuit, thereby operating said signal means.

2. The liquid level sensor system of claim 1 and further comprising:
pressure switch means positioned in the wall of said housing and operable by the pivotally mounted end of said float means;
a second electrical circuit having a source of power; and,
a second signal means connected to said pressure switch means, whereby said second signal means is activated on closing of the second electrical circuit by the activation of said pressure switch means.

3. A liquid level sensor system for a container as recited in claim 1, wherein said signal device consists of a light.

4. A liquid level sensor system for a container as recited in claim 1, wherein said signal device consists of an acoustic device.

* * * * *